US008560376B2

(12) United States Patent
Lienhardt

(10) Patent No.: US 8,560,376 B2
(45) Date of Patent: Oct. 15, 2013

(54) METHOD, SYSTEM, AND COMPUTER PROGRAM PRODUCT FOR A MAINTENANCE OPTIMIZATION MODEL

(75) Inventor: Benedicte Lienhardt, Mondonville (FR)

(73) Assignee: Airbus Operations S.A.S., Toulouse (FR)

( * ) Notice: Subject to any disclaimer, the term of this patent is extended or adjusted under 35 U.S.C. 154(b) by 1615 days.

(21) Appl. No.: 11/756,232

(22) Filed: May 31, 2007

(65) Prior Publication Data
US 2010/0017241 A1 Jan. 21, 2010

(51) Int. Cl.
*G06Q 10/00* (2012.01)
(52) U.S. Cl.
USPC ........................................ 705/7.38; 705/7.11
(58) Field of Classification Search
USPC .............................................................. 705/8
See application file for complete search history.

(56) References Cited

U.S. PATENT DOCUMENTS

| 4,760,530 | A  | * | 7/1988  | Liden ........................... 701/123 |
| 5,363,110 | A  | * | 11/1994 | Inamiya .................... 342/357.31 |
| 7,343,364 | B2 | * | 3/2008  | Bram et al. ...................... 706/47 |
| 7,451,003 | B2 | * | 11/2008 | Chester et al. .................... 700/28 |
| 7,634,384 | B2 | * | 12/2009 | Eryurek et al. ................ 702/182 |
| 2004/0186927 | A1 | * | 9/2004 | Eryurek et al. ................. 710/12 |
| 2005/0210337 | A1 | * | 9/2005 | Chester et al. ................... 714/47 |
| 2006/0089846 | A1 | * | 4/2006 | Middlebrook .................... 705/1 |
| 2006/0161879 | A1 | * | 7/2006 | Lubrecht et al. .............. 717/101 |
| 2006/0206246 | A1 | * | 9/2006 | Walker ............................ 701/16 |
| 2008/0120129 | A1 | * | 5/2008 | Seubert et al. .................... 705/1 |

OTHER PUBLICATIONS

Barroeta, Carlos Eduardo; "Risk and economic estimation of inspection policy for periodically tested repairable components"; University of Maryland, College Park; ProQuest, UMI Dissertations Publishing, 2005. 1428365.*
Lu, Lixuan; "Risk-informed coordinated on-line test and maintenance for safety-critical standby instrumentation and control systems"; The University of Western Ontario (Canada); ProQuest, UMI Dissertations Publishing, 2005. NR12101.*
George W. Van Bodegraven, "Commercial Aircraft Doc Methods", 1990, pp. 1-6.
Dieter Scholz, "A Method to Evaluate Aircraft Systems", 1998, pp. 1-22.
Franklin D. Harris, "An Economic Model of U.S. Airline Operating Expenses", Dec. 2005, pp. 1-78.

(Continued)

*Primary Examiner* — Leland Marcus
(74) *Attorney, Agent, or Firm* — Oblon, Spivak, McClelland, Maier & Neustadt, L.L.P.

(57) ABSTRACT

A method of developing maintenance optimization model includes finding relevant criteria to drive the design towards operational performances at minimal cost for the end user, selecting inputs necessary to assess criteria selected, defining mathematical models to jointly drive the equipment/sub-system/system design and its support towards better supportability, and presenting the maintenance optimization model results to enable the exploration of the cause and effect relationships between design decisions and their operational and support impacts. The selected inputs may cover all the potential factors influencing the criteria values. The mathematical modeling can facilitate leveraging the intuitive "cause and effect" relationship between design and support, and affordability. The maintenance optimization model method, system, and computer program product provides a solid basis for the supportability evaluation of equipment/system/sub-system choices, particularly when integrated in a systematic way into the design process and used from the beginning of the development cycle.

23 Claims, 7 Drawing Sheets

(56) References Cited

OTHER PUBLICATIONS

Jean-Jacques Dindeleux, et al., "Design-Integrated Reliability Studies According to Requirements Analysis and Return of Experience the Proposed ALSTROM Transport Company "EFICARE" Method", 2005, pp. 1-7.

Jim Scanlan, et al., "Cost Modelling for Aircraft Design Optimization", 2002, pp. 261-269.

Dr. Zalman A. Shavell, "The Effects of Schedule Disruptions on the Economics of Airline Operations", Jun. 2000, pp. 1-14.

Dr. Zalman A. Shavell, "The Effects of Schedule Disruptions on the Economics of Airline Operations", Apr. 15, 2000, pp. 1-11.

Robert M.H. Knotts, "Civil Aircraft Maintenance and Support Fault Diagnosis from a Business Perspective", 1999, pp. 335-347.

Larry H. Crow, "Methods for Reducing the Cost to Maintain a Fleet of Repairable Systems", 2003, pp. 392-399.

E. Hugues et al., "ORA, Model and Tool for Predicting Operational Reliability Within Airbus", pp. 1-4, 2004.

E. Hugues, et al., Application of Markov Processes to Predict Aircraft Operational Reliability, May 21-24, 2002, pp. 1-5.

* cited by examiner

US 8,560,376 B2

METHOD, SYSTEM, AND COMPUTER PROGRAM PRODUCT FOR A MAINTENANCE OPTIMIZATION MODEL

BACKGROUND OF THE INVENTION

1. Field of the Invention

The present invention relates to a method, system, and computer program product for a Maintenance Optimization Model (MOM), and more specifically to a method, system, and computer program product including a MOM driving design of a product, such as an aircraft, towards minimum operating cost while ensuring optimum availability for an end-user, such as an airline operating the aircraft.

2. Description of the Related Art

Design of certain products, such as an aircraft, has shifted its focus from the traditional design for performance to designing for affordability and quality. This paradigm shift calls for solutions that are beyond historical databases and demands the consideration of all aspects of the product's life cycle. An approach based on relations among reliability, availability, maintainability, and life cycle cost requirements can be more appropriate (see Jean-Jacques Dindeleux, Jacques J. Durand, Alstom Transportation Inc., and Stephanie Delsaut, Ligeron S. A. Consulting, *Design integrated reliability studies according to requirements analysis and return of experience*, RAMS Symposium, January 2005, incorporated by reference herein).

Life Cycle Cost (LCC) management has gained paramount importance in decision-making processes for new technology, design, and procurements (see Scanlan, James, Hill, Terry, Marsh, Rob, Bru, Christophe, Dunkley, Martin and Cleevely, Paul (2002) Cost modeling for aircraft design optimization. Journal of Engineering Design, 13, (3), 261-269, incorporated by reference herein). Determining the optimum repair and overhaul strategy to minimize LCC is a problem receiving increased attention (see (L. H. Crow, *Methods for Reducing the Cost to Maintain a Fleet of Repairable Systems*, RAMS Symposium, 2003, pp. 392-399, incorporated by reference herein) and (Wallace R. Blischke and D. N. Prabhakar Murthy, *Case study in reliability and maintenance*, 2003).

Product evaluation, for example in the aircraft industry, has been traditionally based primarily on an economical figure: the Direct Operating Cost (DOC). DOC combines parameters like reliability and maintainability by calculating their economical implications. Although it is debated which cost elements do belong in a DOC calculation, and which don't, it is generally admitted that DOC includes those cost elements, which depend on the aircraft itself. Indirect Operating Costs (IOC), in contrast, depend on the way an airline is run (see Van Bondergraven, G. W.: Commercial Aircraft DOC Methods (AIAA/AHS/ASEE Aircraft Design, Systems and Operations Conference, Dayton, 17.-19. Sep. 1990), American Institute of Aeronautics and Astronautics, 1990 (Paper AIAA-90-3224-CP), incorporated by reference herein).

Aircraft DOC methods have been discussed e.g. by:

The Air Transport Association of America, 1967 [ATA 67] (Air Transport association of America: Standard Method of Estimating Comparative Direct Operating Costs of Turbine Powered Transport Airplanes, Washington D.C.: ATA, 1967);

The Association of European Airlines, 1989 [AEA 89a] (Association of European Airlines: Short-Medium Range Aircraft AEA Requirements, Brüssel: AEA, 1989 (G(T)5656)), [AEA 89b] (Association of European Airlines: Long Range Aircraft AEA Requirements, Brussel: AEA, 1989 (G(T)5655));

Airbus Industrie [Airbus 88] (Airbus Industrie: Airbus Project D.O.C. method, Toulouse, 1988 (AI/TA-P812.076/88 ISS.1));

Lufthansa [LUFTHANSA 82] (Lufthansa: DLH Method 1982 for Definition of the Performance and Direct Operating Costs of Commercial Fixed Wing Aircraft, Lufthansa, Hamburg, 1982); and NASA [NASA 05] (National Aeronautics and Space Administration, Franklin D. Harris: An Economic Model of U.S. Airline Operating Expenses, NASA Ames Research Center under Grant NAG-2-1597, (NASA/CR-2005-213476)).

Unfortunately these methods cannot be taken "as is" for an aircraft product evaluation. In contrast to traditional DOC methods, a DOC method on a system level preferably incorporates many system-specific parameters. Therefore, a method called DOCsys has been developed (see D. Scholz: DOCsys, *A Method to Evaluate Aircraft Systems*. Workshop: DGLR Fachausschuβ S2, Luftfahrtsysteme in München. 1998, incorporated herein by reference) which follows the principles of traditional aircraft DOC methods as closely as possible, while taking aircraft system peculiarities into account. DOCsys is similar to the Cost of Ownership (COO) methods previously presented (see Honeywell Inc., Commercial Flight Systems Group: Cost of Ownership Analysis, Phoenix, 1991; and see Dechow, M.; Herold, H.: CONSUL, Berechnungsprogramm für die Ermittlung des Cost of Owership für Systeme und LRUs, Version 1.1, Deutsche Aerospace Airbus, Hamburg, 1994 (EZ32)). These COO methods, however, consider primarily single parts Line Replaceable Units (LRUs) and do not support as much the evaluation of systems and sub-systems. In addition, the term "Cost of Ownership" is also used for the costs resulting in just owning an aircraft, system, or sub-system, without using it (see Odell, T. T.: Boeing HSCT OpCost Methodology, Seattle: Boeing Commercial Airplane Group, 1993 (6-1442-MES-HSCT-002-93)). The term Direct Operating Cost avoids these misinterpretations and DOCsys has several advantages over an evaluation based on separate criteria or based on COO methods. The cost elements considered in the DOCsys method of Scholz are:

fuel costs caused by the system;

Direct Maintenance Cost (DMC) caused by the system;

capital costs caused by necessary spare parts on stock (spare holding costs); and delay, cancellation, and diversion costs caused by an aircraft system.

However, in $DOC_{SYS}$, fuel consumption is not in the supportability scope and several additional aspects are missing. In fact, regulation aspects and maintenance strategies, for example, should be taken into account. Additionally, designing for future support would benefit from models that provide engineers with quantitative arguments regarding the relationship between design decisions and their operational and support-related impacts.

SUMMARY OF THE INVENTION

To meet an end user's expectations, a MOM system that evaluates design choice and associated maintenance policies on system supportability performance is desired.

In one exemplary embodiment, the present invention is directed to a method of developing a maintenance optimization model for an system. The MOM for the system means a modeling technique/methodology considering future operational conditions and user expectations. These operational conditions and expectations can relate to equipment, a sub-system, and/or a system. In a non-limiting exemplary embodiment, the system can be an aircraft system and the user can be an airline. Where "system" is used herein, it is understood that equipment, a sub-system, a system, and/or an aircraft is being considered. Thus, the MOM provides a technique to predict the supportability performance of a product, for example an aircraft, in operation from the point of view of a user, for example an airline.

The method of developing a maintenance optimization model for a system includes determining a plurality of relevant outputs (corresponding to user expectations), determining a plurality of inputs related to the system (like its own characteristics, its operational conditions), examining a plurality of relationships between the plurality of inputs to produce the plurality of relevant outputs, selecting at least one output from the plurality of relevant outputs based on expectations of a user of the system, and designing the maintenance optimization model for the system based on the selected at least one output. The system may be an aircraft system.

The method according to the present invention may also be implemented in, but is not limited to, a system or a computer program product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
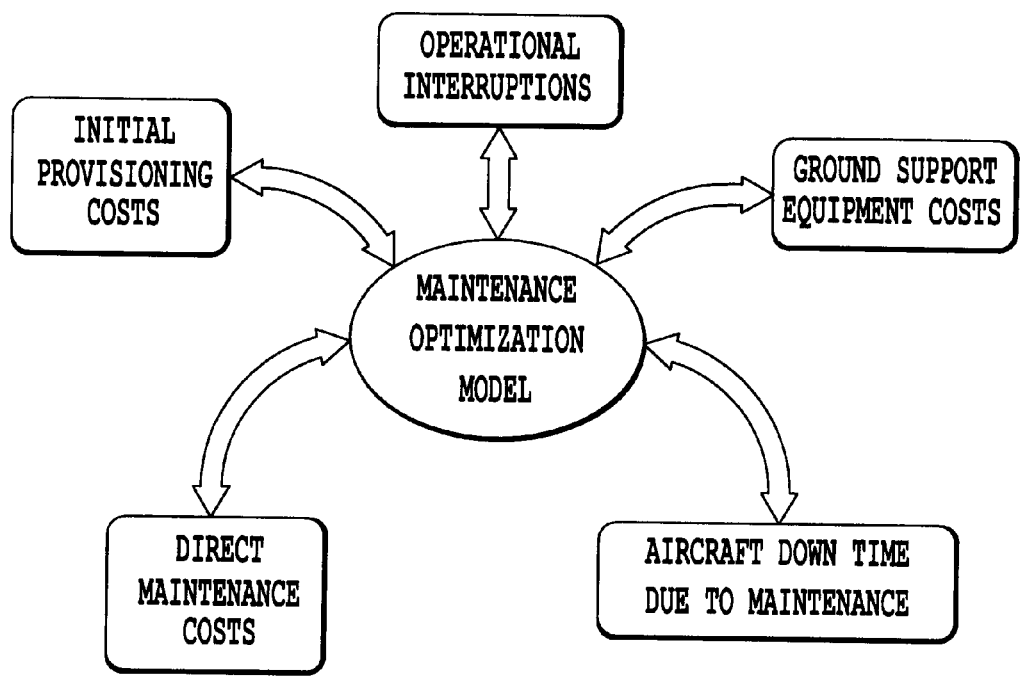
FIG. 1 depicts exemplary outputs of a maintenance optimization model.

Unless other wise defined, the following glossary applies hereinafter:

AD Average Demand
AT Administrative Time
COO Cost Of Ownership
DOC Direct Operating Cost
DS Dispatch Status
DMC Direct Maintenance Cost
ED Estimated Demand
ESS Essentiality
FC Flight Cycle
FH Flight Hours
GDMC Guaranteed Direct Maintenance Cost
GMTBUR Guaranteed Mean Time Between Failures
GSE Ground Support Equipment
I Scheduled interval length
IFTB In-Flight Turn-Back
ILS Integrated Logistic Support
IOc Indirect Operating Cost
IMC Indirect Maintenance Cost
IP Initial Provisioning
LCC Life Cycle Cost
LRU Line Replaceable Unit
LSC Life Support Cost
LT Lead Time
MAD Minimum Average Demand
MEL Minimum Equipment List
MMEL Master Minimum Equipment List
MOM Maintenance Optimization Model
MSG-3 Maintenance Steering Group-3
SPT Shop Processing Time
MTBD Mean Time Between Demands
MTBUR Mean Time Between Unscheduled Removals
MTMMEL Mean Time to apply MMEL
MTTRF Mean Time To Restore the Function.
NbCM Annual Number of Corrective Maintenance actions per aircraft
NbSM Annual Number of Scheduled findings per aircraft
NbST Annual Number of Scheduled maintenance Tasks per aircraft
NFF No Fault Found
NFS Number of Findings during Scheduled task
NUFS Number of Unscheduled Failures between two Scheduled tasks
% GOvsNOGO Percentage of GO/GOIF versus NO GO situations
PL Protection Level
OI Operational Interruption
OR Operational Reliability
ORA Operational Reliability Analyzer
QPA Quantity of the same equipment/component/system Per Aircraft
QRD Quantity of the same equipment/component/system Required for Dispatch
RPK Revenue per Passenger per Kilometer
RQ Recommended Quantity
SPC Spare Part Class
SPT Shop Processing Time
TAT Turn Around Time
Tav Time available for maintenance actions
TLAR Top Level Aircraft Requirement
Tol Tolerance to protection level
TT Transit Time Referring now to the drawings, wherein like reference numerals designate identical or corresponding parts throughout the several views, FIG. 1 shows an alternative comparison of a simplified maintenance optimization model. As shown in FIG. 1, the maintenance optimization model can account for many different costs. Often, when an airline spends money in a certain area, it will lower costs in another area. For instance some activities that are complementary can also sometimes be antagonistic:

Adding redundancies to improve operational reliability will increase maintenance costs;
Adding scheduled maintenance tasks to decrease the potential cost of an unscheduled removal (which can induce delays, high repair cost, aircraft down-time . . . ) will degrade the aircraft availability and increase maintenance costs;
Increasing a supply of spare parts to decrease maintenance downtime (the spare parts will be in stock and will not have to be ordered) will increase the initial provisioning costs.

The maintenance optimization model of the present invention seeks to provide quantitative answers regarding whether a certain choice (such as an expenditure for spare, a fault tolerance, a redundancy, a scheduled maintenance task, etc.)

will actually benefit an airline's overall operation. The objective of the MOM is to reach a compromise. Finding a single solution that is the least expensive (in maintaining and operating), the most reliable and available, having the best failure tolerance, and also being the simplest is rarely possible.

This method, system, and computer program product for a maintenance optimization model should support supportability decision-making in aircraft product design. The goal is to be able to perform different equipment/sub-system/system trade-offs or optimization regarding the overall operating costs to improve customer satisfaction. The results should drive the choices of:

design alternatives or architectures (redundancies, warning, and monitoring policy);
maintenance concept (corrective, preventive, and predictive); and
supplier selection.

Figure 2:
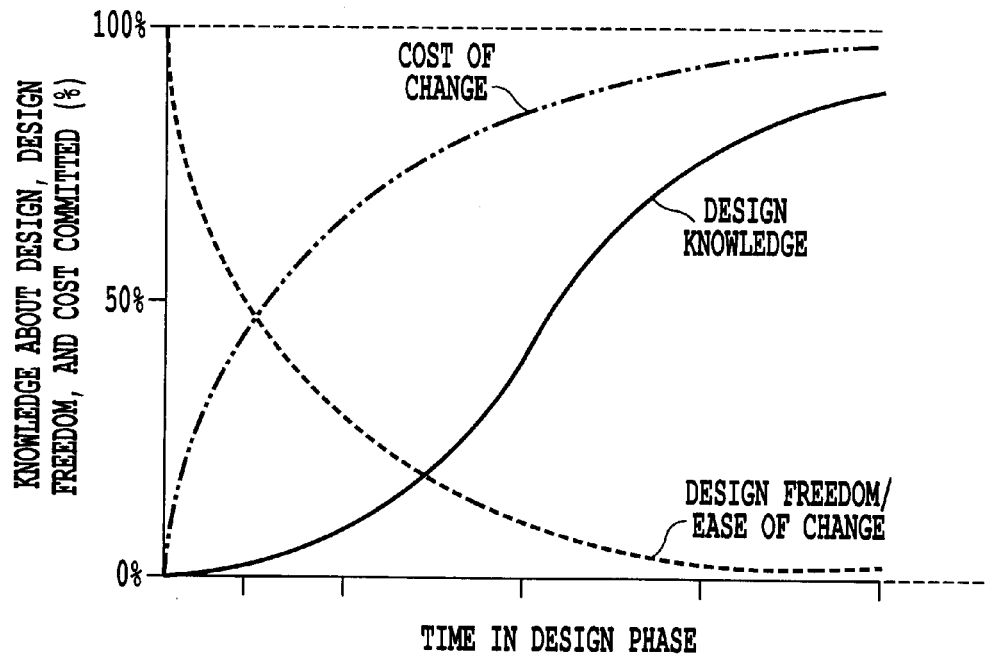
FIG. 2 depicts an exemplary cost-knowledge-freedom dependency from conceptual design to production.
Figure 3:
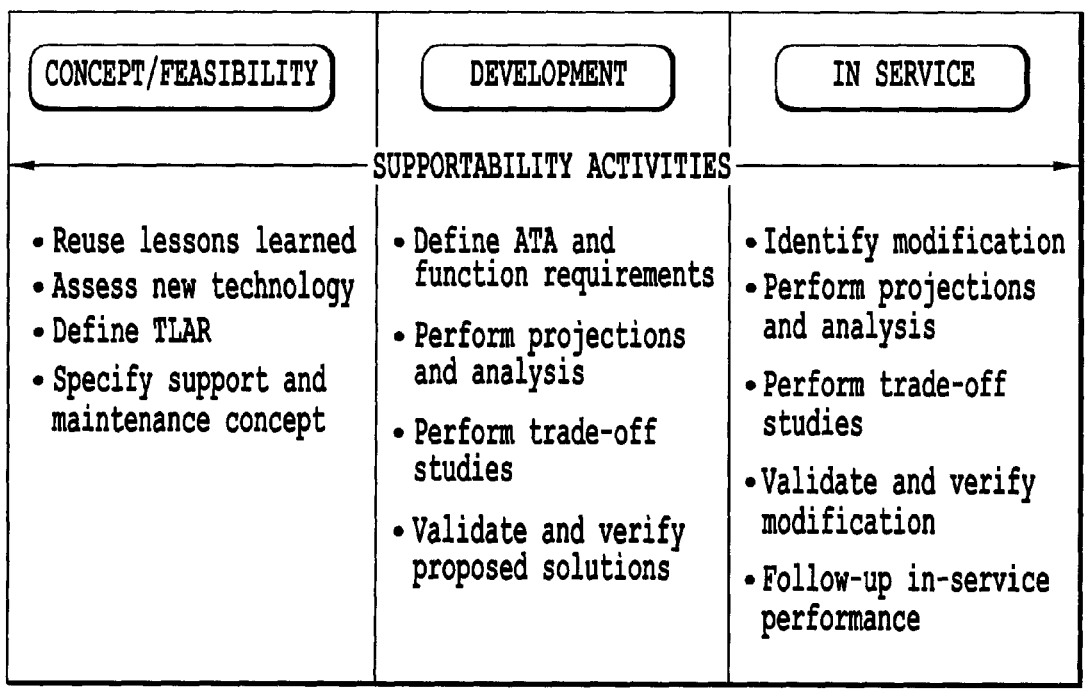
FIG. 3 depicts exemplary supportability activities.

One aim of this method, system, and computer program product for a maintenance optimization model can be to meet the already-established set of requirements (time out of service, OR, DMC, and IP target, etc.). This method, system, and computer program product for a maintenance optimization model can also support a design to support (or design to operating objectives) model to enhance the efficiency of supportability engineers in driving the design towards relevant global support costs savings for the operators. These savings can be obtained when the operability characteristics are actively managed from the earliest stages of the conceptual design and throughout all design activities. In fact, the decisions made in the early phases have a considerable impact on the alternative solution in question. As a consequence, they strongly determine future in-service performances. In particular, there is a strong "cost-knowledge-freedom" dependency from conceptual design to production, as can be seen in FIG. 2. As the design progresses from conceptual design to product release, design freedom can be lost almost immediately. On the other hand, the cost of a change and the design knowledge increases. This "cost-knowledge-freedom" dependency can significantly influence the entire life cycle of an aircraft product, specifically cost and quality, or customer satisfaction. Exemplary supportability activities of the design process can be seen in FIG. 3. Specifically, FIG. 3 shows a number of exemplary supportability activities broken down into various stages including the concept/feasibility stage, the development stage, and the in service stage for an aircraft (or aircrafts). The MOM provides a means to answer to supportability technology assessments, performance predictions, and trade-off studies during the end of concept phase, the feasibility phase, and the beginning of development phase.

The added value of the maintenance optimization model can include to:
introduce new mathematical methods to enhance supportability techniques and credibility;
define a concise and complete model that takes into account all supportability factors needed to derive a sound foundation for meaningful evaluation;
allow rapid assessment in the conceptual stages of aircraft design so that trade-offs can be performed with minimal time and monetary expenditures;
provide an efficient and user-friendly tool to drive design choice towards better global supportability performance;
provide criteria to determine which solution is the best adapted to the problem; and
provide better traceability in the justifying arguments for supportability trade-offs.

Figure 4:
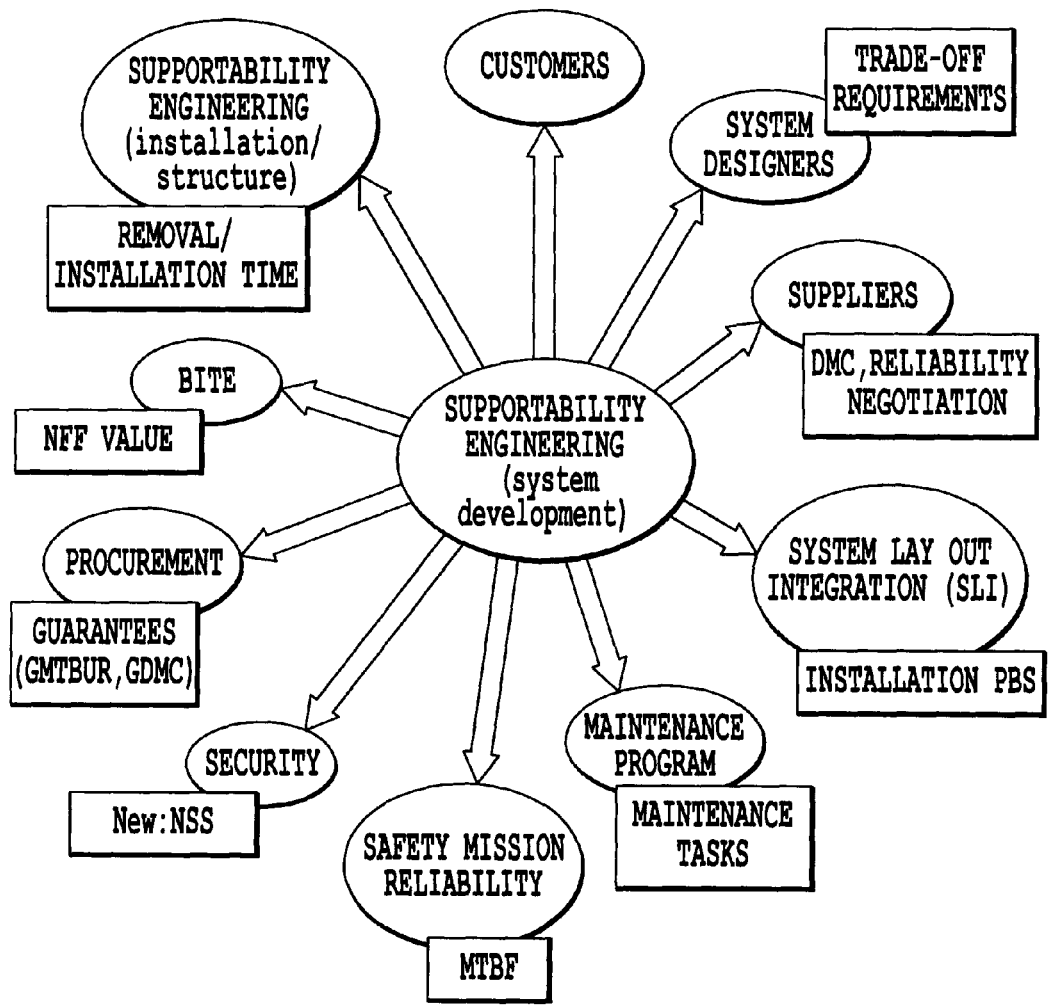
FIG. 4 depicts exemplary supportability interfaces during system development.

The maintenance optimization model can allow the user to explore and use the dependency between different supportability performance factors. As shown in FIG. 4, supportability engineering has many different interfaces during system developments. Such exemplary supportability activities can yield a number of inputs for the MOM. Making a single choice will often affect multiple interfaces. For example, adjusting the maintenance tasks for the maintenance program also affects the direct maintenance costs and reliability negotiation with the suppliers.

The MOM can enable a designer to address several disciplines (Operational reliability, direct maintenance cost, initial provisioning, ground support equipment and maintenance down time) involved to achieve a customer's satisfaction. The final result (the selection of an alternative solution) involving different disciplines is globally better than when disciplines are considered sequentially because interactions between disciplines are taken into account. Significant improvements in aircraft supportability are not likely to be achieved by isolated and piece-wise consideration of related disciplines. Well-coordinated and inter-disciplinary efforts are preferred to yield a qualitative leap in reducing lifetime costs of an aircraft. The consolidation of operability performance (through a single tool with the same set of input data) allows a quicker identification of challenges and/or showstoppers. Moreover, thanks to the MOM, the specialists share best practices to improve and homogenize their "engineering judgment."

In order to achieve the above-listed objectives, relevant criterion or criteria (model's outputs) are selected to assess a potential solution, which will be accepted or rejected. These outputs have values that can drive the overall design of the product, e.g. the design of the aircraft. These criteria reflect equipment/sub-system/system performance as viewed by the end user of the product, e.g. the airline. To predict these criteria, several inputs are necessary. Many inputs and at least one output are selected and analyzed via a detailed probabilistic formulation as discussed below. First, the selection of outputs will be explained. Second, the selection of inputs will be explained. Finally, the probabilistic formulation for evaluating the outputs on the basis of the inputs so that the MOM can be developed will be explained.

I. Selection of Outputs

A problem in complex equipment/sub-system/system design is measuring the "goodness" of a design, i.e. finding criteria through which a particular design is determined the "best." The problem definition yields a set of objectives on which the engineer can base his design decisions. These parameters, called criteria, play an important role in the decision-making process, deeming a potential equipment/sub-system/system solution successful, when their customer-desired level is met. The MOM outputs are customer-supplied guidelines (e.g. airline's expectations) that form the basis for the decision-making process in the design phase of the product to be used by the designer (e.g. aircraft supportability specialists). Thus, the customer's need are linked directly to the decision-making process.

The output parameters can be related to:
1. Operational Interruptions (OI);
2. Direct Maintenance Costs (DMC);
3. aircraft down time due to maintenance;
4. Initial Provisioning (IP) costs; and
5. Ground Support Equipment (GSE) cost.

Supportability performances are given in terms of cost by considering economic implications caused by specific equipment/sub-system/systems, so that:
a common unit can be established to integrate all supportability performances;

potential economic risk areas can be quantified; and supportability can be taken into consideration along with other global aircraft performance factors (weight, drag, etc.).

Next, the five outputs listed above are described in greater detail. Their impact on airline satisfaction is high. Often, the accumulation of maintenance cost over aircraft life is roughly equal to the acquisition price. Thus, airlines must carefully weigh both the potential maintenance costs of an aircraft and the aircraft's acquisition price when considering whether to purchase a new aircraft. Moreover, the acquisition price is not a significant cost with regard to all supportability aspects. In addition to the acquisition price, additional costs such as inventory, spares/tools, disposal, transportation, facilities, operating, technical publications, support equipment, training, etc. must be considered when evaluating all supportability aspects.

Generally, the MOM according to the present invention can be used or adapted to design products, other than aircraft, for which the maintenance cost of the product life is about equal to, or greater than, the acquisition price of the product. For example, the present invention can be used in the design of military aircraft, spacecraft, trains, boats, weapon systems, submarines, and other complex products for which operating and support costs are not negligible with regard to acquisition cost.

For an aircraft, a first output can be related to operational interruptions (1). Operational Interruptions (OI) are defined to include delays at take-off greater than 15 minutes, flight cancellations, and in-flight turn-back or diversions. The OI rate is the frequency of operational interruptions among all scheduled flights.

OI rates and costs are assessed because they remain a top priority for all operators given their strong commercial impact and since a lack of punctuality is a major cause for customer dissatisfaction. Thanks to the application of the present MOM method, system, and computer program product by an aircraft manufacturer, the airline can expect improved utilization of their product with higher product availability.

The consequences for airlines related to the costs of delays due to OI have been explained (see Dr. Zalman A. Shavel, The effects of scheduled disruptions on the economics of airline operations, 3rd USA/Europe Air Traffic Management R&D Seminar Napoli, 15 Apr. 2000 and R. M. H Knotts, *Civil aircraft maintenance and support, Fault diagnosis from a business perspective*, Journal of Quality in Maintenance, Vol. 5, No 4, 1999, pp. 335-350, each of which is herein incorporated by reference). The primary costs of delays due to OI include its direct consequences on the affected flight, for example:

crew related costs (overtime, hotel, and meals);

aircraft related costs (additional fuel burnt, additional maintenance, and spare and stand-by aircraft); and passenger related cost (meals, indemnity, lodging for individuals or payment to other airlines, and fare revenue lost when passengers switch to competitors).

Secondary costs of delays due to OI reflect the consequences of the aircraft not being able to meet the requirements of its schedule, for example:

flights on additional legs scheduled for the aircraft are delayed;

crew is not able to connect with other aircrafts as scheduled, passengers miss connections, etc.; and ill will is created.

The effects of cancellations are mainly passenger's related costs. Generally airlines have demonstrated a marked preference for delays and cancellations over diversions.

A second output can include direct maintenance costs (2). Maintenance costs can be split into categories, mostly indirect (material handling, supplies) and direct (labor and material costs). Maintenance costs are an important issue since their accumulation over an aircraft's life is roughly equivalent to the purchase price of the aircraft.

One of the design goals of the present invention is to drive the minimization of future maintenance burdens and costs. As an aircraft manufacturer, one major cost parameter that can be influenced is the direct maintenance cost (DMC). To reflect maintenance policy impact, the following are assessed:

DMC triggered by scheduled maintenance, including the cost to perform the task and, in case of findings, labor and material costs; and DMC triggered by unscheduled maintenance, residual labor, and material costs.

A third output can include aircraft downtime due to maintenance (3). Today, maintenance has to be fast because large profit losses can be attributed to this downtime. What the airline expects is to increase the time the aircraft generates revenue. To estimate this output, consider, for example:

for scheduled maintenance, the mean time to check a function, and in case of findings, the mean time to restore a function; and for unscheduled maintenance, the mean time to restore a function, and in case of MMEL dispatch, the mean time to apply MMEL.

The downtime due to modifications for a service bulletin or cabin reconfiguration, or due to non-chargeable OI events, is not included in maintenance downtime.

This output is also converted into costs by considering a potential loss of revenue since the aircraft cannot fly during this maintenance time. This sum can be estimated as the profit gained if the aircraft had been flying instead of experiencing maintenance downtime.

A fourth output can include the initial provisioning cost (4). This Initial Provisioning (IP) cost can include, for example, the cost of spares through the annual credit payment to buy the recommended quantity. The provision of an appropriate stock of spares can be critical for support costs and the availability of a functions.

The above outputs are all given in terms of costs. However, for a typical type of airline (low-cost, major, charter . . . ) certain outputs are more important to its needs than other outputs.

II. Selection of Inputs

The inputs needed in the early design of an aircraft are often unknown and, as a result, they often need to be estimated. These estimates are mainly based on:

data collected from in-service experience;

knowledge of the current design within an airline and information coming from the suppliers;

knowledge of future operations and support (major airline customers and aircraft mission attributes); and traced assumptions validated by a design team, program management, and airlines.

The outputs are described below and can be linked to the following kinds of inputs:

1. data reflecting aircraft mission profile, independent of the particular alternative solution (equipment, system, sub-system) studied;

2. financial data, independent of the particular alternative solution studied;

3. constant parameters, independent of the particular alternative solution studied;
4. scheduled maintenance data dependent on the particular alternative solution studied; and
5. information on alternative solution characteristics (in terms of reliability, maintainability, testability, maintenance policies and interaction or link between equipment, sub-system, system), dependent on the particular alternative solution studied.

Next, the five kinds of inputs listed above will be described in more detail.

Exemplary mission profile (1) inputs may include the following:
Data related to aircraft:
  Fleet size
  Number of seats
  Passenger load factor (%)—the ratio of the equivalent full fare booked seats to the number of available seats
  Revenue per Passenger per Kilometer (RPK) ($)
  Cost of one air interruption ($)
  Cost of one cancellation ($)
  Cost of one hour of delay ($)
Data related to flight scheduling:
  Annual use (FH), flight hours per year
  Number of flights between two stops
  Stop duration (hours)
Data related to flight phase:
  Flight duration (FH)
  Flight range (km)
Data related to ground phase:
  TAT (hours), turn around time between two successive flights Exemplary financial data (2) inputs may include the following:
Labor rate ($/ManHour) and efficiency (%) for base and line maintenance
Credit rate (%)
Amortization period (years) for the credit Exemplary constant parameter (3) inputs may include the following:
Threshold_GO_NOGO (%) states when dispatch status is not equivalent to an essentiality (ESS) code. In fact the ESS code comes directly from the dispatch status (Ess code 1 for dispatch status NO GO, Ess code 2 for dispatch status GO IF, and Ess code 3 for dispatch status GO) except if the % of GO/GO IF versus NO GO situation is lower than the Threshold_GO_NOGO (e.g. 40%). In this case, the essentiality code is always 1 regardless of the dispatch status.
Minimal Average Demand (MAD) for each ESS code. To compute the minimum stock level as a function of accepted risk of first demand, set the annual MAD on the fleet equal to (for example): 0.3 for ESS code=1; 0.6 for ESS code=2; and 1 for ESS code=3.
Scrap rate (%)—the percent of units which, when removed from service, are found to be beyond economic repair or irreparable and therefore scrapped. It is initialized according to Spare Part Class (SPC):
  For SPC 1, i.e. expendable (throwaway, high scrap rate), for example ScrapRate=999/1000;
  For SPC 2, i.e. rotable (spare repairable, medium scrap rate), for example ScrapRate=500/1000; and
  For SPC 6, i.e. repairable (repairable spare, low scrap rate), for example ScrapRate=5/1000.
Administrative Time (AT) in days to prepare a spare purchase, e.g. AT=30 days. AT is the customer administration time to handle the replenishment process of expendable parts. This value is added onto the lead-time.
Transit Time (TT) in days to transport spare from aircraft to shop and inversely, e.g. TT=10 days. TT describes the elapsed time in calendar days from removal of the defective part from the aircraft over airline administration, shipping to and back from the repair shop and customs until the repaired item is back on the airline's shelf ready for use. This value is added to the Shop Processing time (SPT).
Lead Time (LT) in days to receive the purchased spare. LT is the maximum number of calendar day from receipt of the part at the repair base until dispatch is, for example:
  7 days for ESS code 1, and 2 and part with MTBUR<5,000 FH
  45 days for other repair rotables and expendables.
Protection Level (PL) (%) for each ESS code (the protection level of the initial provisioning gives an indicator of the probability of having a spare available when required). PL is the probability, expressed in percentage, to indicate the anticipated chance to have the selected spare on stock following the Gauss/Poisson distribution of demands, and is from 80-98%. Reasonable protection levels range from 80-98% and can be different for NO-GO, GO-IF, and GO items as well as for expendable, repairable, and rotable spares or alternatively low, medium, and high cost items. In this exemplary embodiment, the protection level is defined according to the essentiality code (ESS Code).

|  | ESS CODE | | |
| --- | --- | --- | --- |
|  | 1 | 2 | 3 |
| Protection level | 95% | 92% | 89% |

Figure 6:
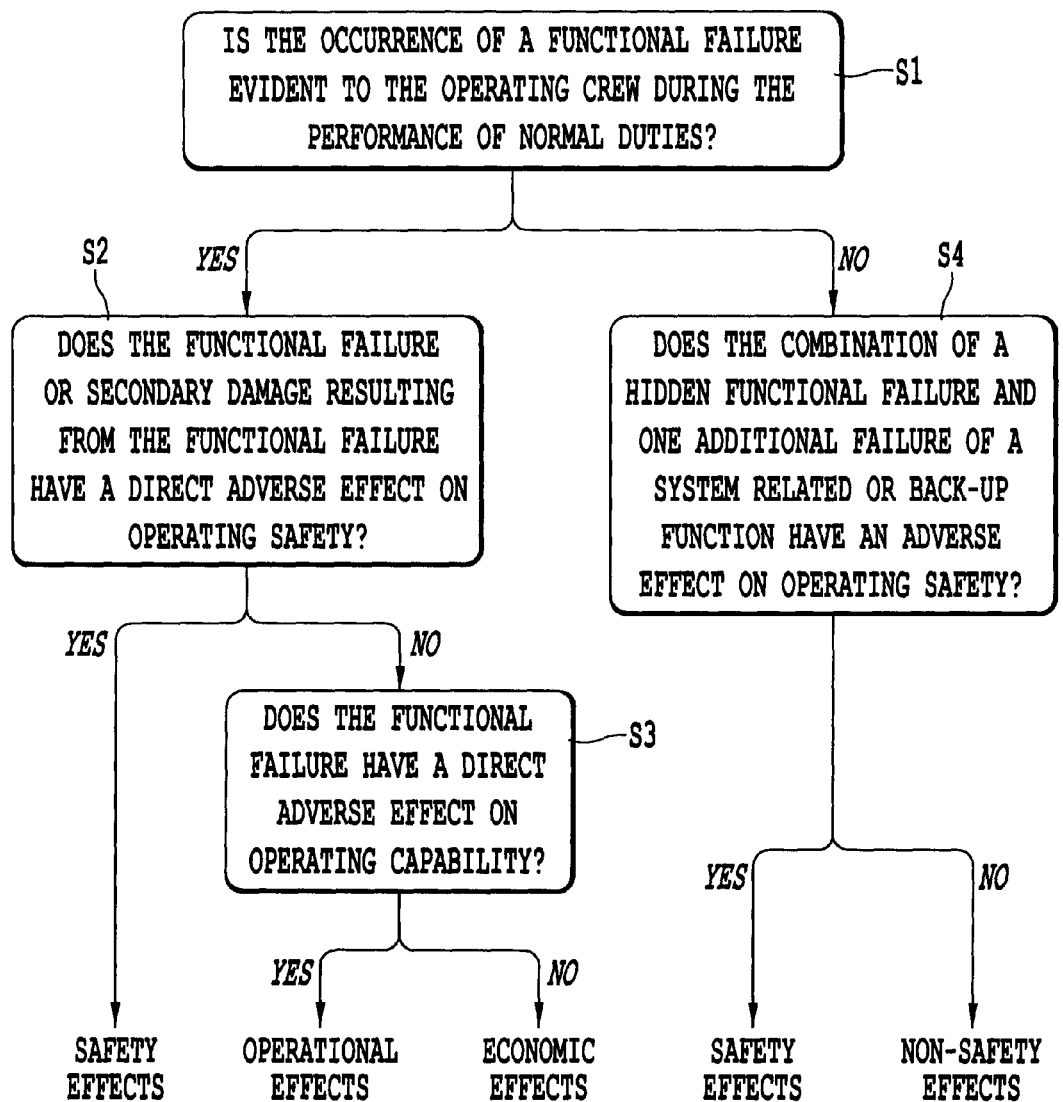
FIG. 6 depicts an exemplary MSG-3 decision logic diagram.

Tolerance (Tol) (%) with regard to the protection level. The accepted tolerance for the protection level is for example 1%
Customized Redundancy Factor (CRF) (e.g. 80%) to take advantage of item redundancy for spare quantity
Residual value (e.g. 10%) of the initial investment after the depreciation period Exemplary scheduled maintenance data (4) inputs may include the following:
Task applicable on (Text)—list of item checked during the task
Task reference (Text)—reference of the scheduled maintenance task among the others applicable on the aircraft considered
Task to reduce OI risk (Text)—indication about the objective of the scheduled maintenance task
Quantity checked (QtyChecked)—number of identical equipment/sub-system/system checked during the scheduled maintenance task per aircraft
Mean Time Between Demands (FH)—mean time between operational demands of the equipment/sub-system/system (trigger event or additional failure) that makes the hidden failure visible. The hazard rate of operational demands is $\lambda_D$
Interval period (FH, FC, months, days)
Check working time (ManHours)—time during scheduled maintenance for checking if the equipment/sub-system/system is still working Elapsed time (hours)—aircraft immobilization on ground for making scheduled maintenance checks Material Cost ($/task)—cost of destroyed material used for making equipment/sub-system/system checks Exemplary information on system characteristics (5) inputs may include the following:

Reference to the scheduled task performed on the equipment/sub-system/system. This scheduled maintenance grouping enables the MOM to deal with the fact that a scheduled maintenance task may impact several items. Additionally, recounting the time to perform the scheduled task if several items checked during the same task are analyzed is avoided. This kind of functional approaches provides consistency with Safety analyses, MMEL status, alarm philosophy, and particularly scheduled maintenance determination processes. The method for determining the scheduled maintenance tasks and intervals for systems and power plants can be based on a progressive logic diagram, for example the progressive logic diagram described in the Maintenance Steering Group-3 (MSG-3) document, the contents of which are incorporated herein by reference. It establishes a logical breakdown of the aircraft into functional areas. In order to determine the appropriate maintenance tasks, the specialist first identifies the functions. Next, for each function, the analysts determine the possible failures that could occur to prevent the item from performing its intended function. Then, for each functional failure, the analysts determine the possible effects that could result from the failure. According to the operational and economical consequences, a scheduled task may be selected. FIG. 6, described in detail below describes an exemplary method for selecting a scheduled task.

Figure 5:
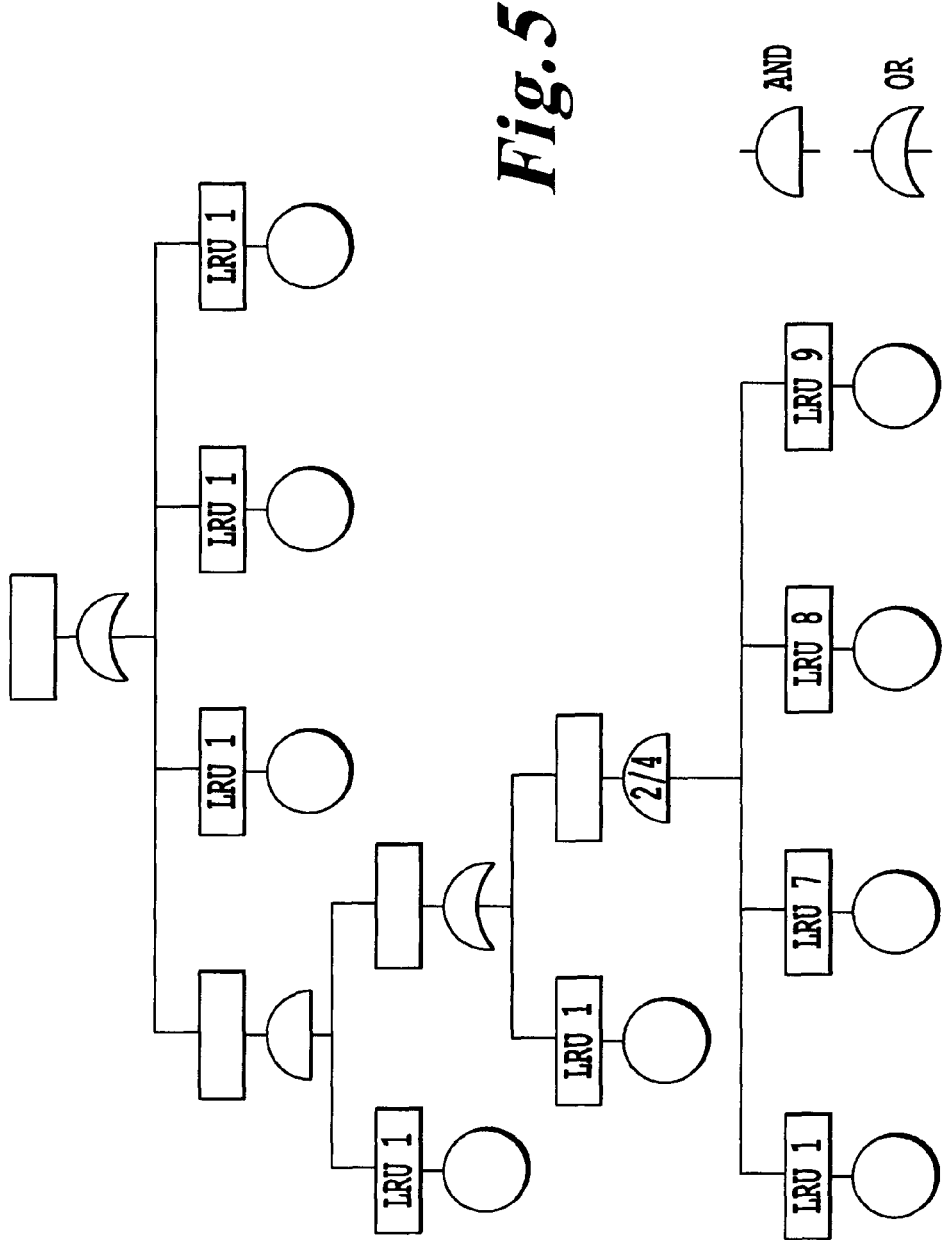
FIG. 5 depicts an exemplary fault tree diagram.

Referring now to Operational Reliability grouping, including all connected equipment/sub-systems/systems. Engineers often need to work with elements connected in parallel and/or series. To calculate the system operational reliability, a method, like the fault tree method utilized with the exemplary fault tree diagram shown in FIG. 5, can be used to analyze dependent and independent failure modes. In the technique known as "fault tree analysis", an undesired effect is taken as the root ('top event') of a tree of logic. Then, each situation that could cause that effect is added to the tree as a series of logic expressions. Thus, the fault tree is built top-down and in term of events rather than blocks. The fault tree uses a graphic "model" of the pathways that can lead to a foreseeable, undesirable loss event (or a failure). The pathways interconnect contributory events and conditions, using standard logic symbols (AND, OR etc). The basic constructs in the fault tree diagram are gates and events, where the events have an identical meaning as a block in an Reliability Block Diagram and the gates are the conditions. The two most commonly used gates in a fault tree are the AND and OR gates as shown in FIG. 5. If occurrence of either event causes the top event to occur, then these events (blocks) are connected using an OR gate. Alternatively, if both events need to occur to cause the top event to occur, they are connected by an AND gate.

Quantity of equipment/sub-system/system under study Per Aircraft (QPA)—must be an integer greater than zero.

Quantity Required for Dispatch of equipment/sub-system/system (QRD)—must be an integer greater than zero and less than QPA.

Dispatch Status (DS) or commercial MMEL status—the dispatch status can take only three values: GO, GO IF, and NO GO. In the case where the number of equipment/sub-system/system failures is larger or equal to QRD:

GO indicates that it is not necessary to make an immediate heavy maintenance action on equipment;

GO IF indicates that it is not necessary to make an immediate heavy maintenance action on equipment if certain conditions are satisfied; and NO GO indicates that an immediate heavy maintenance action on equipment is necessary.

Maximal deferring time (FH)—the maximal allowed time in FH per equipment/sub-system/system, before one must take heavy maintenance actions on the equipment (restricted to items with GO and GO IF dispatch status).

Percentage of GO/GOIF versus NO GO situations when MMEL allows differed maintenance (% GOvsNOGO) (%)—the airline frequency of accepted fault tolerance (implying deferred maintenance actions) in the case of GO and GO IF dispatch status. The airliner (more precisely the pilot and the crew) can decide to defer the heavy maintenance actions on equipment or take immediate heavy maintenance actions (% GOvsNOGO equals to 100% if MMEL is always applied).

Mean Time Between Unscheduled Removals, MTBUR (FH).

Spare Part Class (SPC) (Text), expendable, rotable or repairable.

Mean action time for deferring (hours)—when light maintenance actions must be performed (the airline opted to defer the maintenance, GO and GO IF situation), the time in hours associated with these light maintenance actions is the Mean Time to apply MMEL (MTMMEL), and trouble shooting time is included.

Mean Time To Restore the Function (MTTRF) (hours).

Time available (Tav) (hours)—the total time available for a maintenance action (corrective maintenance or maintenance actions for deferring repair/replacement), excluding the delay (time available is always lower or equal to TAT).

No Fault Found (NFF) (%)—the percentage of equipment detected as failed while still working.

Guaranteed Mean Time Between Unscheduled Removals (GMTBUR), the MTBUR guaranteed by the supplier—comes from a negotiation with the aircraft manufacturer.

Restore man hour (hours)—the number of man-hours to be paid for the repair of the failed equipment.

Repair cost ($)—test cost is included.

Test cost ($)—included in test cost.

Spare price ($)—for the initial acquisition.

GDMC OFF known ($/A/C.F.H.), Direct Maintenance Cost off of the aircraft guaranteed by the system supplier.

Shop repair time (days)—shop test time included.

Shop test time (days)—included in shop repair time.

III. Probabilistic Formulation

The above-described inputs are analyzed based upon the above-described outputs to develop a maintenance optimization model. The following probabilistic formulations can be used to reach an optimized maintenance model and an optimized system design solution according to the inputs and the selected outputs based upon each user's required supportability performances. Supportability performances are determined in terms of costs to allow all of the different categories of supportability to be integrated and compared with one another.

The following general assumptions were made in developing the method, system, and computer program product for optimizing a maintenance model:

the failure rate of all fleet equipment/sub-system/systems is constant and failures of all fleet systems are assumed to be statistically independent with the same probability distribution;

the failure rate of a hidden default, $\lambda_H$, is given by 1/MTBUR;

the rate of occurrence of the demand, $\lambda_D$ (additional failure, trigger event) can be a function of time. In our exemplary embodiment the failure rate of demand is constant (homogeneous Poisson process), $\lambda_D$=/MTBD, and there will be no more than one demand at any given time;

for scheduled maintenance, only failure findings checks were considered, not MTBUR improvements;

for corrective maintenance, the breakdowns are minimally repaired and for minimal repair, a failed item is returned to operation with the same effective age it had immediately prior to failure; and there is no time-value for money, thus, money available now is not worth more than the same amount in the future regardless of its potential earning capacity.

Probabilistic formulations are explained herein for the following:

1. number of findings in scheduled maintenance;
2. number of maintenance actions;
3. aircraft downtime due to maintenance;
4. direct maintenance costs;
5. initial provisioning costs;
6. ground support equipment costs; and
7. operational interruption costs.

Regarding the number of findings in scheduled maintenance (1), it is first determined what are the failure effects of items (equipments, sub-systems, systems) considered for the maintenance optimization model. The MSG-3 decision logic diagram shown in FIG. 6 can be used to define which aircraft equipment/sub-systems/systems are considered and how they are considered for the maintenance optimization model.

First, in step S1 it is determined whether the occurrence of a functional failure is evident to the operating crew during the performance of normal duties.

If the occurrence of a functional failure is evident (YES in step S1), then, in step S2 it is determined whether the functional failure or secondary damage resulting from the functional failure has a direct adverse effect on operating safety.

If there is a direct adverse effect on safety (YES in step S2), then the item has safety effects and the item's maintenance schedule is not analyzed.

If there is no direct adverse effect on safety (NO in step S2), then it is determined in step S3 whether the functional failure has a direct adverse effect on operating capability.

If there is a direct adverse effect on operating capability (YES in step S3), then the item has operation effects and the equipment/sub-system/system's maintenance schedule is analyzed, and one objective of the analysis is to avoid OI. The scheduled maintenance input parameter "Task to reduce OI risk" equals "Yes".

If there is no direct adverse effect on operating capability (NO in step S3), then the item has economic effects and the item's maintenance schedule is analyzed. The OI is not a major criterion in this case. The scheduled maintenance input parameter "Task to reduce OI risk" equals "No".

If the occurrence of a functional failure is not evident (NO in step S1), then, in step S4, it is determined whether the combination of a hidden functional failure and one additional failure of an equipment/sub-system/system related or backup function has an adverse effect on operating safety.

If it is determined that there is an adverse effect on operating safety (YES in step S4), then the item has safety effects and the item's maintenance schedule is not analyzed.

If it is determined that there is no adverse effect on operating safety (NO in step S4), then the item has non-safety effects and the item's maintenance schedule is analyzed. If one objective of the scheduled maintenance task is to avoid OI, then the scheduled maintenance input parameter "Task to reduce OI risk" equals "Yes".

A hidden function includes the following:
a function which is normally active and whose cessation will not be evident to the operating crew during performance of the crew's normal duties; and
a function which is normally inactive and whose readiness to perform, prior to it being needed, will not be evident to the operating crew during performance of the crew's normal duties.

The loss of the function or the occurrence of the functional failure can be considered evident if it is associated with an equipment/sub-system/system that is operated at least once during a day's operation, and the loss of the function or the occurrence of the failure can be detected by the crew.

For evident failures without safety effects, if a scheduled task is planned, the failed equipment/sub-system/system repair/replacement will occur at the next scheduled maintenance period, even if the defect is visible beforehand. Thus, the consequences are considered to be sufficiently acceptable so that equipment repair/replacement can wait for the next scheduled task. In this case, the mean time between demands is theoretically infinite (the demand is continuous), in the tool interface they are equal to 0 (MTBD=0).

The Number of Findings during a Scheduled task (NFS) of the evident failure is expressed for one item over one interval in the following equation:

$$NFS(I) = 1 - e^{-I/MTBUR}$$

The Number of Unscheduled evident Failures between Scheduled tasks (NUFS) is expressed for one item over one interval in the following equation:

$$NUFS(I) = 0$$

For hidden failures without safety effects, the failure is not evident to the crew or operator during the performance of normal duties. The failure occurs in such a way that the operator does not know that the item is in a failed state unless some other operational demand (a trigger event such as an additional failure of a related equipment/sub-system/system or backup function) also occurs.

Figure 7:
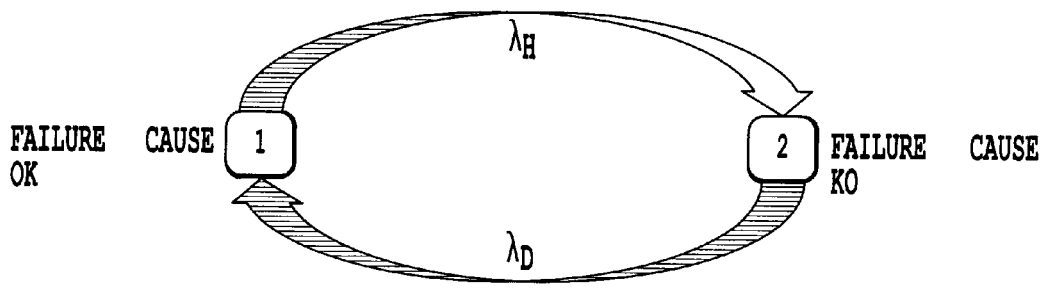
FIG. 7 depicts an exemplary Markov graph.

If the hidden failure of an equipment/sub-system/system checked during a failure-finding task is in an operating state, nothing is done. If the hidden failure of the equipment/sub-system/system checked during a failure-finding task is in a failed state, it is replaced by a new component of the same type, or restored to a "good as new" condition. This type of equipment/sub-system/system can be modeled by the Markov graph shown in FIG. 7 along with the following equations:

Y(t)=1 if the equipment/sub-system/system is functioning at time t–no hidden failure at time t Y(t)=2 if the equipment/sub-system/system is not functioning at time t–the hidden failure cause has occurred at time t The Markov graph shown in FIG. 7 stands for the real situation on an aircraft when:
a hidden failure occurs with hazard rate $$\lambda_H = 1/MTBUR,$$

thus, a working item (state 1) becomes a failed item (state 2); and
this hidden failure is detected with hazard rate $$\lambda_D = 1/MTBD$$

and repaired immediately, thus, a failed item (state 2) becomes a working item (state 1).

Therefore, we have the following new equations (new equations meaning equations resulting from an understanding of in-service aircraft operation and support, and from the knowledge of the input parameters that can be estimated, at least roughly, in early design):

$$P(Y(t) = 1) + P(Y(t) = 2) = 1, \forall t \in I$$

$$\begin{pmatrix} P(\dot{Y}(t) = 1) \\ P(\dot{Y}(t) = 2) \end{pmatrix} = \begin{pmatrix} -\lambda_H & \lambda_D \\ \lambda_H & -\lambda_D \end{pmatrix} \begin{pmatrix} P(Y(t) = 1) \\ P(Y(t) = 2) \end{pmatrix}$$

with initial conditions: $P(Y(0)=1)=1$ and $P(Y(0)=2)=0$ $$\forall t \in I \; P(Y(t) = 1) = \frac{\lambda_D}{\lambda_D + \lambda_H} + \frac{\lambda_H}{\lambda_D + \lambda_H} e^{-(\lambda_D + \lambda_H)t}$$

$$\forall t \in I \; P(Y(t) = 2) = \frac{\lambda_H}{\lambda_D + \lambda_H} - \frac{\lambda_H}{\lambda_D + \lambda_H} e^{-(\lambda_D + \lambda_H)t}$$

When determining the Number of Findings during a Scheduled task (NFS) of the hidden failure, NFS(I) is the mean number of findings of the hidden failure (during the scheduled maintenance task). This number is expressed for one item over one interval as follows:

$$NFS(I) = P(Y(I) = 0)$$

$$NFS(I) = \frac{\lambda_H}{\lambda_D + \lambda_H}(1 - e^{-(\lambda_D + \lambda_H)I})$$

NFS(I) is also the probability to detect a failure for one aircraft during failure-finding tasks performed at time I.

When determining the number of unscheduled events due to the combination of hidden failures and process demands, $\forall t \in I$ NUFS(t) is the mean number of unscheduled findings of the hidden failure in [0; t]. In fact, it is the mean number of combined failures. This number is expressed for one item over one interval and NUFS(t) is a renewal process. $\omega_H(t)$ is defined as the Rate Of Occurrence Of Failure (ROCOF) (i.e. the failure rate of the renewal process), as follows:

$$\omega_H(t) = \lim_{\Delta t \to 0} \frac{P(NUFS(t + \Delta t) - NUFS(t) = 1)}{\Delta t}$$

Thus, we have the following new relationships regarding the results on renewal process law:

$$\forall t \in I, \omega_H(t) = \frac{dNUFS(t)}{dt}$$

$$\forall t_1, t_2 \in I, t_1 \leq t_2 \, NUFS(t_2) - NUFS(t_1) = \int_{t_1}^{t_2} \omega_H(\tau) d\tau,$$

with the initial condition $$NUFS(0) = 0$$

$$\forall t \in I \; P(NUFS(t + \Delta t) - NUFS(t) = 1) = \lambda_D P(Y(t) = 2)\Delta t + o(\Delta t)$$

$$\forall t \in I \; \omega_H(t) = \lambda_D P(Y(t) = 2)$$

$$\forall t \in I \; \omega_H(t) = \frac{\lambda_D \lambda_H}{\lambda_D + \lambda_H}(1 - e^{-(\lambda_D + \lambda_H)t})$$

$$\forall t \in I \; NUFS(t) = \lambda_D \int_0^t P(Y(\tau) = 2) d\tau$$

$$\forall t \in I \; NUFS(t) = \frac{\lambda_D \lambda_H}{\lambda_D + \lambda_H}t - \frac{\lambda_D \lambda_H}{(\lambda_D + \lambda_H)^2}(1 - e^{-(\lambda_D + \lambda_H)t})$$

Thus, we have the following new relationships:

$$NUFS(I) = \lambda_D \int_0^I P(Y(\tau) = 2) d\tau$$

$$NUFS(I) = \frac{\lambda_D \lambda_H}{\lambda_D + \lambda_H}I - \frac{\lambda_D \lambda_H}{(\lambda_D + \lambda_H)^2}(1 - e^{-(\lambda_D + \lambda_H)I})$$

The following probabilistic formulation applies to the number of maintenance actions (2). Regarding the number of maintenance actions, the following remarks apply:
- when there is no schedule maintenance task, interval lengths are theoretically infinite, but in the MOM tool interface they are equal to 0;
- when there is no scheduled task, failures are considered as evident (mathematically, this means that failures are repaired instantaneously); and
- when there is a scheduled task, all of an item's failures in the quantity checked are either evident or hidden. If failures are evident, the repair/restoration waits for the next scheduled maintenance task to repair. If failures are hidden, repairs are done in a corrective maintenance if operational demand occurs. Otherwise repairs are done at the next scheduled maintenance task, if necessary.

Regarding the number of maintenance actions, both the number of scheduled maintenance actions and the number of corrective maintenance actions needs to be analyzed.

For scheduled maintenance actions, there are three cases to distinguish.

The first case is evident failures without scheduled maintenance. The parameter NbST sets the annual number of scheduled maintenance tasks per aircraft. If there is no scheduled task, then NbST=0. The parameter NbSM sets the annual number of scheduled findings per aircraft. If there is no scheduled task, then NbSM=0.

The second case is evident failures with scheduled maintenance. If there is a scheduled task (I greater than 0 in the MOM tool interface), then the following equations apply:

$$NbST = \frac{AnnUse}{I},$$

$$NbSM = QtyChecked \times NFS(I) \times NbST$$

The third case to distinguish is hidden failures with scheduled maintenance. If there is a scheduled task (I greater than 0 in MOM tool interface), then the following equation applies:

$$NbST = \frac{AnnUse}{I},$$
$$NbSM = QtyChecked \times NFS(I) \times NbST$$

Moreover several checks on the same equipment/sub-system/system can be considered with the following rules:
- if, on the same equipment/sub-system/system, some of the applied intervals are related to scheduled maintenance tasks intended to reduce OI risk, use 1 mm (the minimum among the intervals for the tasks that can decrease OI risk) everywhere, except in MaintenaneDown-Time_SM et DMC_SM where the contributions of "man hour" and "elapsed time" are summed and multiplied by NbST calculated with the corresponding intervals; and
- if none of the intervals reduce OI, use $I_{min}$ (the minimum among all intervals applied) everywhere except in MaintDownTime_SM et DMC_SM where the contributions "Man hour" and "Elapsed time" are summed and multiplied by the factors NbST calculated with the corresponding intervals.

For the number of corrective maintenance actions, the same three cases need to be distinguished.

For evidence failures without scheduled maintenance, the parameter NbCM corresponds to the annual number of corrective maintenance actions per aircraft, and the following equation applies:

$$NbCM = \frac{QPA}{MTBUR} \times AnnUse$$

For evident failures with scheduled maintenance, the following equation applies:

$$NbCM = \frac{QPA - QtyChecked}{MTBUR} \times AnnUse$$

For hidden failures with scheduled maintenance, the following equation applies:

$$NbCM = QtyChecked \times NUFS(I) \times NbST + \frac{QPA - QtyChecked}{MTBUR} \times AnnUse$$

The following probabilistic formulation applies to aircraft downtime due to maintenance (3). First maintenance downtime is examined and then the potential loss of revenue due to the maintenance downtime is determined.

Regarding maintenance downtime, all types of maintenance actions increase ground time preventing an aircraft from making revenue-generating flights. Aircraft downtime due to maintenance is expressed as hours per aircraft per year.

The ground time due to corrective maintenance in the case of GO or GO IF items is not considered when the captain of the airplane (or other individual in command) allows dispatch.

The following new equations can be used:

$$MaintDowntime\_SM = \frac{NbSM}{QtyChecked} \times MTTRF + NbST \times ElapsedTime$$

Remark:

NbSM is divided by quantity checked because it is supposed that items are repaired in parallel (for consistency with OR model). This is not applicable to corrective maintenance actions (repair can occur at whatever different times).

If the dispatch status is NO GO: MaintDowntime_CM=NbCM×MTTRF

Otherwise if the dispatch status is GO or GO IF:

$$MaintDowntime\_CM = NbCM \times [(1-\% GOvsNOGO) \times MTTRF + \% GOvsNOGO \times MTMMEL]$$

If the scheduled task entails checking different items, the elapsed time is counted only one time per task in the program due to scheduled task grouping. Care needs to be taken when consolidating this value at aircraft level because it is not a simple sum.

Next, the potential loss of revenue due to maintenance downtime will be discussed. The potential loss of revenue due to maintenance downtime is expressed as $ per aircraft per flight hour. The potential loss of revenue is in fact the profit gained per flight multiplied by the ratio of maintenance down time by the average time between two takeoffs. The following new equation applies:

$$LossOfRevenue = \frac{MaintDowntime\_SM + MaintDowntime\_CM}{AnnUse} \times \frac{NbFlightsBetweenStops \times (RPK \times NbSeat \times LoadFactor \times Distance)}{NbFlightsBetweenStops \times T_{flight} + (NbFlightsBetweenStops - 1) \times TAT + StopDuration}$$

Wherein, $$\frac{MaintDowntime\_SM + MaintDowntime\_CM}{AnnUse}$$

is the downtime for maintenance activities per flight hour.

RPK multiplied by assumed passengers carried per flight and distance is the revenue per flight.

RPK×NbSeat×LoadFactor×Distance is the profit gained between two take-offs.

$$\frac{NbFlightsBetweenStops \times T_{flight} + (NbFlightsBetweenStops - 1) \times TAT + StopDuration}{NbFlightsBetweenStops}$$

is the average time between two take-offs.

Next, the probabilistic formulation for direct maintenance costs (4) is examined. Regarding Direct Maintenance Costs (DMC), the following applies.

Guaranteed DMC OFF aircraft is calculated according to the following equation:

$$GDMCoff_{Tool} = \frac{QPA}{GMTBUR} \times (1 - ScrapRate) \times \begin{bmatrix} NFFrate \times TestCost + \\ (1 - NFFrate) \times RepairCost \end{bmatrix}$$

Guaranteed DMC OFF aircraft is expressed in $ per aircraft per flight hour.

The DMC triggered by scheduled maintenance includes:
manpower cost;
material cost;
maintenance cost in shop; and
spare price.

DMC triggered by scheduled maintenance is calculated according to the following new equations as a direct function of the scheduled maintenance frequency:

$$DMC_{SM\ ON} = \frac{NbSM}{AnnUse} \times \left( BaseLaborRate \times \frac{RestoreManHour}{BaseLaborEfficiency} + ScrapRate \times SparePrice \right) +$$

$$\frac{NbST}{AnnUse} \times \left( \frac{MaterialCost + BaseLaborRate \times CheckManHour}{BaseLaborEfficiency} \right)$$

$$DMC_{SM\ OFF} = \frac{NbSM}{AnnUse} \times (1 - ScrapRate) \times RepairCost$$

DMC is expressed in $ per aircraft per flight hour.

In case of scheduled maintenance, we supposed that NFF rate=0. The man-hours to perform the task are counted only one time per task in the program due to scheduled task grouping. If labor efficiency input equals 0 (i.e. input not filled in the MOM tool interface), use 0.001 in the informatics program.

If the repair cost is not yet known (RepairCost=0 in the MOM tool interface), then add a part of the GDMC OFF known filled by the user to the $DMC_{SM}$ as follows:

$$DMC_{SM\ OFF} = GDMCoff_{Known} - \frac{NbCM \times GDMCoff_{known}}{QPA \times AnnUse/GMTBUR}$$

The DMC triggered by corrective maintenance includes:
manpower cost;
maintenance cost in shop; and
spare price.

The DMC triggered by corrective maintenance is calculated according to the following new equations:

$$DMC_{CM\ ON} = \frac{NbCM}{AnnUse} \times \begin{bmatrix} LineLaborRate \times \\ RestoreManHour + (1 - NOGO) \times \\ \frac{\% GOvsNOGO \times MTMMEL}{LineLaborEfficiency} + \\ ScrapRate \times SparePrice \end{bmatrix}$$

$$DMC_{CM\ OFF} = \frac{NbCM}{AnnUse} \times (1 - ScrapRate) \times \begin{pmatrix} NFFrate \times TestCost + \\ (1 - NFFrate) \times RepairCost \end{pmatrix}$$

The DMC is expressed in $ per aircraft per flight hour. The DMC triggered by corrective maintenance value is impacted by the potential scheduled maintenance through the calculation of NbCM and is impacted by the MMEL status and its consideration within the airline.

If labor efficiency input equals 0 (i.e. input not filled in the MOM tool interface), use 0.001 in the informatics program. If the repair cost is not yet known (RepairCost=0 in the MOM tool interface), then add a part of the GDMC OFF known filled by the user to the $DMC_{CM}$ as follows:

$$DMC_{CM\ OFF} = DMC_{CM\ OFF} + \frac{NbCM \times GDMCoff_{Known}}{QPA \times AnnUse/GMTBUR}$$

The DMC ON minus the cost to perform the task is calculated as follows by the new equation:

$$DMC\ ON_{withiut\ Routine\ SM} = \frac{QPA}{MTBUR} \times \begin{bmatrix} LineLaborRate \times \\ RestoreManHour + (1 - NOGO) \times \\ \frac{\% GOvsNOGO \times MTMMEL}{LineLaborEfficiency} + \\ ScrapRate \times SparePrice \end{bmatrix}$$

Next, the probabilistic formulation of Initial Provisioning (IP) costs (5) will be discussed. Regarding the Initial Provisioning (IP) costs, a recommended quantity of spare parts for the fleet will be determined. After the recommended quantity is determined, the IP costs will be determined at the fleet level and the IP credit costs will be determined at the fleet level and at the aircraft level.

First, a recommended quantity of spare parts for the fleet needs to be determined. A Poisson process is used to depict a failed part arrival processes. The respective annual Recommended Quantity for the entire fleet (RQ) of stock of spare parts on hand is determined via the process described below.

A standard model for a single-location service-parts system states that, where there exists only the emergency service class, the replenishment process is equivalent to an ∞/G/M queue. Additionally, the steady-state number of customers in the queuing system (the customers for whom there are outstanding orders in the inventory system) is Poisson distributed with a mean equal to the arrival rate multiplied by the average service time (e.g. shop processing time).

The annual average demand (AD) on the fleet per year is given by:

$$AD = \frac{AnnUse \times QPA \times FleetSize}{GMTBUR}$$

If AD indicates a low risk of first demand, the Recommended Quantity (RQ) is null. Thus, if AD<MAD, then RQ=0. If AD renders a flight operational risk that is too high (i.e. AD≥0), the annual RQ on the fleet is equal to or greater than 1.

To determine the estimated demand via re-supply time via Poisson distribution analysis, the annual Estimated Demand (ED) on the fleet (the demand rate during re-supply time), is given by:

$$ED = \frac{AD}{365} \times \left[ \begin{array}{c} (SPT + TT) \times (1 - ScrapRate) + \\ (LT + AT) \times ScrapRate \end{array} \right]$$

Shop Processing Time (SPT), the total number of calendar day from receipt of the part at the repair base until dispatch, is calculated as follows:

SPT=NFFrate×TestTime+(1−NFFrate)×Re pairTime

If Poisson(ED≤$RQ_{MIN}$)≥PL−Tol, then RQ=$RQ_{MIN}$
Otherwise, continue as follows.

The reduction of recommended quantity via redundancy analysis for GO IF parts needs to be determined. If the item has an ESS code equal to 2 and QPA greater than or equal to 2, then we define a Customized Redundancy Factor (CRF), and the amount of redundancy factor to be considered is calculated as follows:

$$ED = \frac{ED}{1 + CRF}$$

RQ can be lower than 10. As a result, the Poisson distribution table can be used to calculate the number of stock items to ensure probability that an item is available within the probability required (Protection Level, PL). RQ is the following percentile:

RQ=Poisson Inverse Cumulative Distribution[PL,ED]

In fact, the recommended quantity is incremented until the protection level is greater or equal to the Protection Level (PL).
If RQ≥2 and Poisson(ED≤RQ−1)≥PL−TOL, then RQ=RQ−1
The IP price at fleet level can be determined as follows:

IPPrice=Spare Price×RQ

IP price is expressed as $ per fleet per year.
The IP credit cost at fleet level is the annual credit payment calculation during the spare amortization period and is calculated according to the following new equation:

$$IPCreditCost = \frac{IPPrice \times CreditRate}{1 - (1 + CreditRate)^{-AmortPeriod}} - IPPrice \times ResValue/AmortPeriod$$

IP credit cost is expressed as $ per fleet per year.
The common unit $/FH is needed for the IP credit costs. Thus, since the IP acquisition cost is occurring before the aircraft flight, the idea of a credit to have IP cost occurring while the aircraft is flying is used. The same idea can be used for GSE.

For an exemplary annual credit payment calculation, refer to <http://www.cbangue.com/credit/principe.php>.

The IP credit cost at fleet level can be broken down to the IP credit cost at aircraft level according to the following equation:

$$IPCreditCost = \frac{IPCreditCost}{FleetSize \times AnnUse}$$

Fleet size reflects the number of aircraft for which the MOM can be run. However, the number of allocated aircraft might diverge from this. A MOM can be set up for less then the entire fleet of aircraft.

Next, a probabilistic formulation for the Ground Support Equipment (GSE) costs (6) will be examined. The economical impact of a specific GSE is assessed. The GSEFleetPrice is estimated in $ per fleet and represents the sum of all specific GSE prices given to equipment. The annual credit payment calculation is calculated during an amortization period. Thus, the GSE cost for the fleet is determined according to the following new equation:

$$GSECreditFleetCost = \frac{GSEFleetPrice \times CreditRate}{1 - (1 + CreditRate)^{-AmortPeriod}} - GSEFleetPrice \times ResValue/AmortPeriod$$

The GSE is expressed as $ per fleet per year.
The GSE credit cost at fleet level can be broken down to the GSE credit cost at aircraft level according to the following equation:

$$GSECreditCost = \frac{GSECreditFleetCost}{AnnUse \times FleetSize}$$

Next, the probabilistic formulation for the operational interruption (OI) costs (7) is examined. However, if the mission duration equals zero, then the OI rate and cost are not estimated.

To perform operational reliability projections, the accepted model is the Operational Reliability Analyzer (ORA). ORA invention is explained in E. Hugues, L. Saintis. A. Cabarbaye, ORA, model and tool for predicting Operational Reliability within Airbus, 2004, Lambda Mu p 448-451, E. Hugues, E. Charpentier and A. Cabaraye, Application of Markov processes to predict aircraft operational reliability, 3rd European Systems Engineering Conference (EUSEC), TOULOUSE, May 21st to 24th, 2002, pp. 231-235, and Airbus internal journal, "Aircraft Design Principles" E. Hugues, 2004, each of which is incorporated by reference herein. The MOM retrieves the OI rate per 10,000 take-offs from this model. This ORA output reflects the OI rate, if there is no scheduled maintenance (I=0 in the MOM tool interface).

In the case of scheduled maintenance (I≠0 in the MOM tool interface), the OI rate from ORA may be decreased. The OI rate according to an exemplary maintenance optimization model is calculated according to the following equation:

$$MOM\_OIrate = ORA\_OIrate \times \frac{\sum_{Items\ in\ OR\ grouping} NbCM}{\sum_{Items\ in\ OR\ grouping} \frac{QPA}{MTBUR} \times AnnUse}$$

Otherwise (if no scheduled maintenance is performed), the following ORA result is directly used:

MOM_OIrate=ORA_OIrate

The OI rate is expressed per 10,000 take-offs.
Regarding OI cost, in the same way the OI cost from ORA may decrease. To calculate the OI cost according to the MOM, use the following equation:

$$MOM\_OICost = ORA\_OIcost \times \frac{\sum_{\text{Items in OR grouping}} NbCM}{\sum_{\text{Items in OR grouping}} \frac{QPA}{MTBUR} \times AnnUse}$$

Otherwise, if no scheduled maintenance is performed the following ORA result is directly used:

MOM_OICost=ORA_OI cost

The OI cost is expressed in $ per aircraft per flight hour.

IV. Utilizing the MOM

Additionally, the MOM can be used during the design phase by an engineer to determine whether an input, such as a possible design change, will yield a favorable outcome. Such a tool can provide an engineer with quantitative answers to design questions.

The method can also be adapted to submarine and train specificities. In fact, the MOM can be adapted to any product for which operating and support cost are not negligible with regard to acquisition cost.

Figure 8:
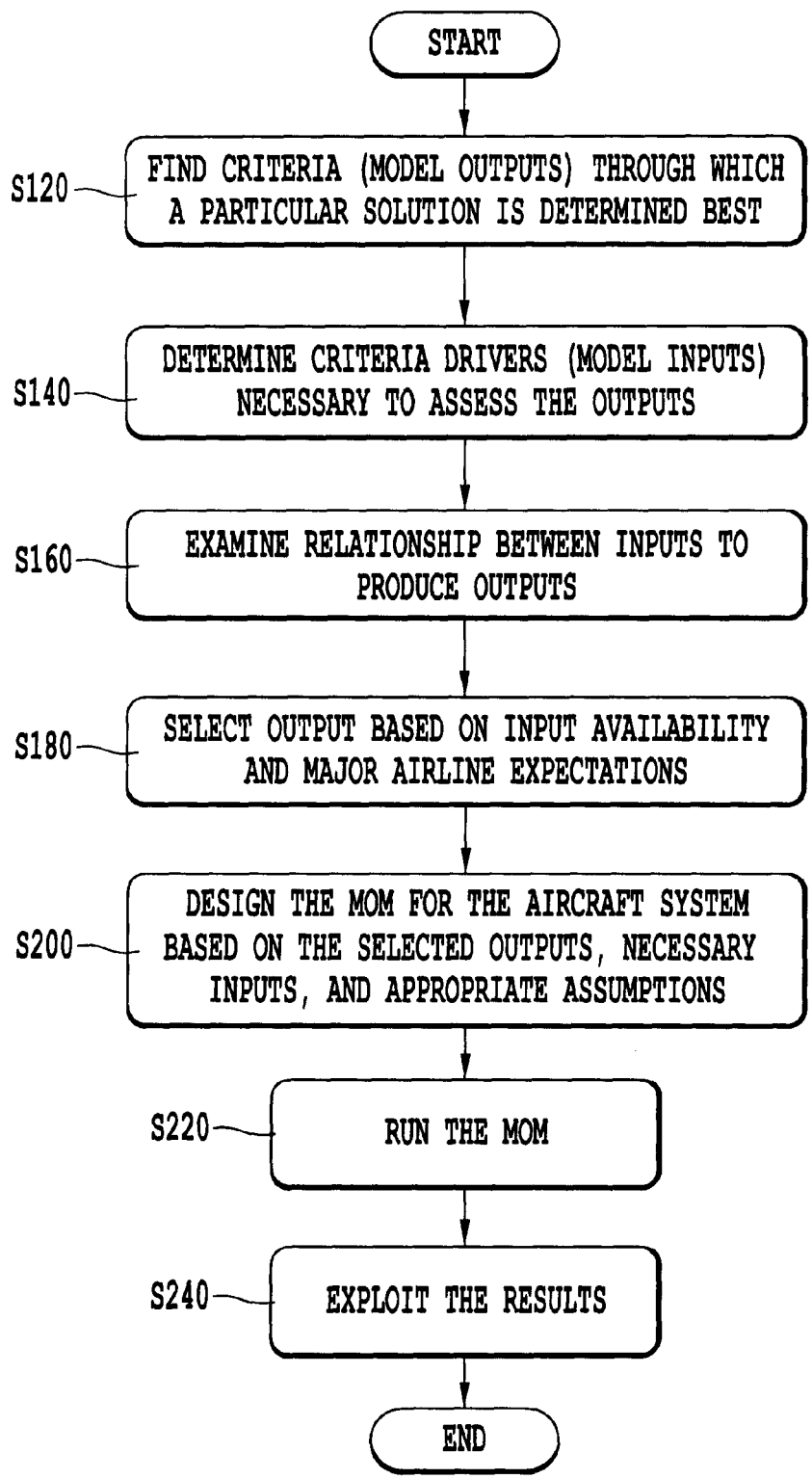
FIG. 8 depicts an exemplary embodiment of a method of developing the maintenance optimization model.

An exemplary embodiment of how to implement a MOM is shown in FIG. 8. When a designer, such as an aircraft manufacturer, decides to develop a MOM, the user, in step S120, finds criteria (model outputs) through which a particular solution is best determined with regard to future customer, such as an airline. Next, in step S140, the designer determines criteria drivers (model inputs) necessary to assess the outputs. Then, in step S160, the relationships between inputs is examined to produce outputs (model probabilistic formulation). Next, in step S180, the user selects any number of the outputs based on input availability and on an airline's expectations. Then, in step S200, the MOM is designed for the aircraft equipment/sub-system/system based on the selected outputs, necessary inputs, and appropriate assumptions. Then, in step S220, the MOM is run. Finally, in step S240, the results of running the MOM can be exploited. Of course, there can be variations in the order in which the steps described above can be performed. Additionally, once the MOM is developed, some of these steps can be left out.

As discussed below, the MOM can be maintained on a computer. The MOM and/or its outputs can be displayed in any number of ways including, for example, on a computer monitor, in a printed copy, or sent to a personal digital assistant.

Any of the above probabilistic formulations, individually, or in combination, can be used to develop a maintenance optimization model depending on the needs of a MOM user.

The inventive method for developing a MOM conveniently may be implemented using a conventional general-purpose computer, a handheld device that includes a microprocessor, or microprocessor programmed according to the teachings of the present invention, as will be apparent to those skilled in the computer art. Appropriate software can readily be prepared by programmers of ordinary skill based on the teachings of the present disclosure, as will be apparent to those skilled in the software art.

A general-purpose computer may implement the method of the present invention. The general purpose computer may include a computer housing that houses a motherboard which contains a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other optical special purpose logic devices such as ASICs (application specific integrated circuits) or configurable logic devices such as GAL (generic array logic) and reprogrammable FPGAs (field programmable gate arrays).

The computer may also include plural input devices, (e.g. keyboard, mouse, and a display card for controlling a monitor). Additionally, the computer may include a floppy disk drive; other removable media devices (e.g. compact disc, tape, and removable magneto optical media); and a hard disk or other fixed high density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

As stated above, the system may include at least one computer readable medium. Examples of computer readable media include compact discs, hard disks, floppy disks, tape, magneto optical disks, PROMs (e.g., EPROM, EEPROM, Flash EPROM), DRAM, SRAM, SDRAM, etc.

Stored on any one or on a combination of computer readable media, the present invention includes software for controlling both the hardware of the computer and for enabling the computer to interact with a human user. Such software may include, but is not limited to, device drivers, operating systems, and user applications, such as development tools.

Such computer readable media further includes the computer program product of the present invention for performing the inventive method herein disclosed. The computer code devices of the present invention can be any interpreted or executable code mechanism, including but not limited to, scripts, interpreters, dynamic link libraries, Java classes, and complete executable programs.

The invention may also be implemented by the preparation of application specific integrated circuits (ASICs) or by interconnecting an appropriate network of conventional component circuits, as will be readily apparent to those skilled in the art.

A MOM system could be integrated in a Web technology (server/client) in order to share and harmonize MOM technologies for prediction. Today the MOM tool can be implemented in visual basic application and it can be programmed in java also.

Additional developments included in the present invention include:

Sensitivity analysis technique—in order to better support decision-making, in addition to the above-described quantification of engineering information, the MOM can be utilized to go from a quantification of an engineering information, towards a qualification of this information: to associate a measured level of confidence. The chosen configuration must be stable to small disturbances of the considered hypotheses, coming from changes in the requirements, from uncertainty on the intrinsic parameters of the evaluation function, or from the model itself. By managing uncertainty in the early phases of aircraft design, the quality of the results given by the MOM can be improved.

Optimization technique—the competitive economic environment with which airline companies are confronted requires optimization of the different supportability contributors as early as possible to obtain better products. An inverse problem can be modeled to adjust MOM inputs (like maintenance strategies) towards better supportability performances. Thus, the output boundaries (minimum and maximum values) can be fixed and which input variation is possible to maintain the outputs within the fixed boundaries can be determined.

Optimization technique—in the present utilization of the MOM, the objective is to predict and understand the consequences for the airlines of aircraft manufacturer choices. The method can also be used the other way around: to have a given airline's performance dictate what should be the aircraft equipment/sub-system/system characteristics and support. It is a problem of inverse optimization. This inverse order provides very relevant information to the supportability specialists since it allows the specialists to know what must be enhanced to reach customer satisfaction.

Bottom-up result consolidation for outputs linked to downtime—a meaningful bottom up consolidation of asset utilization results at an equipment/sub-system/system level would provides an airline with valuable aircraft level values. The intent is to provide better ways of consolidating prediction results of maintenance cost and downtime from component level to aircraft level.

Time-distribution performance technique—money valuation techniques like NPV can be used to give more than an average supportability performance. The time value of money could be interpreted. In fact, money available at the present time is worth more than the same amount in the future, due to its potential earning capacity. This core principle of finance holds that, provided money can earn interest, any amount of money is worth more the sooner it is received. Thus, the measures of aircraft economic viability within the MOM can take into account both the non-cash elements of costs and the time value of money.

Structure and installation system aspects—the MOM concept can also be adapted to assess airline supportability consequences of structure and installation systems.

Health monitoring opportunities—prognostics and diagnostic considerations can be integrated within the MOM model to consider predictive maintenance.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of developing a maintenance optimization model for an aircraft system, comprising:
   determining a plurality of relevant outputs of the maintenance optimization model;
   determining a plurality of inputs of the maintenance optimization model related to the aircraft system;
   storing, on a memory of a computer, a plurality of relationships between the plurality of inputs to produce values for each of the plurality of relevant outputs;
   selecting at least one output from the plurality of relevant outputs based on expectations of a user of the aircraft system;
   adjusting one of the plurality of inputs, the adjusted one of the plurality of inputs being related to a functional failure of a component of an aircraft of the aircraft system;
   running the maintenance optimization model on a processor of the computer such that the relationships produce values for each of the plurality of outputs relevant to the adjusted one of the plurality of inputs, the plurality of relationships including
   determining whether an occurrence of the functional failure is evident to an operating crew during performance of normal duties;
   determining whether the functional failure or secondary damage resulting from the functional failure has a direct adverse effect on operating safety;
   determining whether the functional failure has a direct adverse effect on operating capability;
   when the functional failure is hidden from the operating crew, determining whether a combination of the hidden functional failure and one additional failure of a system related function or back-up function has an adverse effect on the operating safety; and
   determining if the component is part of one of the systems checked during a scheduled maintenance task;
   when the functional failure has the direct adverse effect on operating safety, concluding the running of the maintenance optimization model such that the maintenance schedule of the component is not analyzed; and
   when the functional failure does not have the direct adverse effect on operating safety,
      analyzing a change in the selected at least one output based on the adjusted one of the plurality of inputs, and
      updating the maintenance schedule of the component of the aircraft to include the adjusted one of the plurality of inputs when the selected at least one output is improved with the adjusted one of the plurality of inputs.

2. The method according to claim 1, wherein the user is an airline.

3. The method according to claim 1, wherein the plurality of inputs includes
   data related to a mission profile,
   financial data,
   constant parameters,
   scheduled maintenance data, and
   information on system characteristics.

4. The method according to claim 3, wherein the data related to a mission profile includes data related to the aircraft system, data related to flight scheduling, data related to flight phase, and data related to ground phase.

5. The method according to claim 1, wherein the plurality of outputs includes
   operational interruptions,
   direct maintenance costs,
   down time due to maintenance,
   initial provisioning costs, and
   ground support equipment costs.

6. The method according to claim 5, wherein the operational interruptions include delays at take-off greater than fifteen minutes, flight cancellations, and in-flight turn-back or diversions of each aircraft of the aircraft system.

7. The method according to claim 1, wherein the plurality of relationships includes
   a number of findings in scheduled maintenance,
   a number of maintenance actions,
   down time due to maintenance,
   direct maintenance costs,
   initial provisioning costs,
   ground support equipment costs, and
   operational interruption costs.

8. A method of influencing building of an aircraft, comprising:
running the maintenance optimization model developed according to the method of claim 1; and
influencing the building of the aircraft based on the running of the maintenance optimization model.

9. A method of influencing system supplier selection, comprising:
running the maintenance optimization model developed according to the method of claim 1; and
influencing system supplier selection based on the running of the maintenance optimization model.

10. A method of analyzing a supportability impact of system utilization, comprising:
running the maintenance optimization model developed according to the method of claim 1; and
analyzing the supportability impact of system utilization based on the running of the maintenance optimization model.

11. The method according to claim 1, further comprising:
entering a test input into the maintenance optimization model;
examining changes in the at least one output; and
making an engineering decision based on the examined changes.

12. The method according to claim 1, further comprising:
displaying results from the running of the maintenance optimization model.

13. The method according to claim 1, wherein when the functional failure of the component is evident to the operating crew during performance of normal duties and the functional failure does not have the direct adverse effect on operating safety, the maintenance schedule of the component of the aircraft is maintained.

14. A non-transitory computer readable medium including computer executable instructions, wherein the instructions, when executed by a processor, cause the processor to perform a method comprising:
determining a plurality of relevant outputs of a maintenance optimization model for an aircraft system;
determining a plurality of inputs of the maintenance optimization model related to the aircraft system;
storing, on a memory of a computer, a plurality of relationships between the plurality of inputs to produce values for each of the plurality of relevant outputs;
selecting at least one output from the plurality of relevant outputs based on airline expectations;
adjusting one of the plurality of inputs, the adjusted one of the plurality of inputs being related to a functional failure of a component of an aircraft of the aircraft system;
running the maintenance optimization model on the processor of the computer such that the relationships produce values for each of the plurality of outputs relevant to the adjusted one of the plurality of inputs, the plurality of relationships including
determining whether an occurrence of the functional failure is evident to an operating crew during performance of normal duties;
determining whether the functional failure or secondary damage resulting from the functional failure has a direct adverse effect on operating safety;
determining whether the functional failure has a direct adverse effect on operating capability;
when the functional failure is hidden from the operating crew, determining whether a combination of the hidden functional failure and one additional failure of a system related function or back-up function has an adverse effect on the operating safety; and
determining if the component is part of one of the systems checked during a scheduled maintenance task;
when the functional failure has the direct adverse effect on operating safety, concluding the running of the maintenance optimization model such that the maintenance schedule of the component is not analyzed; and
when the functional failure does not have the direct adverse effect on operating safety,
analyzing a change in the selected at least one output based on the adjusted one of the plurality of inputs and
updating the maintenance schedule of the component of the aircraft to include the adjusted one of the plurality of inputs when the selected at least one output is improved with the adjusted one of the plurality of inputs.

15. The non-transitory computer readable medium according to claim 14, wherein the plurality of inputs includes
data related to a mission profile,
financial data,
constant parameters,
scheduled maintenance data, and
information on aircraft system characteristics.

16. The non-transitory computer readable medium according to claim 15, wherein the data related to a mission profile includes data related to the aircraft system, data related to flight scheduling, data related to flight phase, and data related to ground phase.

17. The non-transitory computer readable medium according to claim 14, wherein the plurality of outputs includes
operational interruptions,
direct maintenance costs,
aircraft down time due to maintenance,
initial provisioning costs, and
ground support equipment costs.

18. The non-transitory computer readable medium according to claim 17, wherein the operational interruptions include delays at take-off greater than fifteen minutes, flight cancellations, and in-flight turn-back or diversions of each aircraft of the aircraft system.

19. The non-transitory computer readable medium according to claim 14, wherein the plurality of relationships includes
a number of findings in scheduled maintenance,
a number of maintenance actions,
aircraft down time due to maintenance,
direct maintenance costs,
initial provisioning costs,
ground support equipment costs, and
operational interruption costs.

20. A non-transitory computer readable medium including computer executable instructions, wherein the instructions, when executed by a processor, cause the processor to perform a method comprising:
running the maintenance optimization model developed according to the method performed by the computer readable medium of claim 14; and
analyzing a supportability impact of system utilization based on the running of the maintenance optimization model.

21. The non-transitory computer readable medium according to claim 14, wherein the method further comprises:
entering a test input into the maintenance optimization model;
examining changes in the at least one output; and
making an engineering decision based on the examined changes.

22. The non-transitory computer readable medium according to claim 14, wherein the method further comprises:
   displaying results from the running of the maintenance optimization model.

23. The non-transitory computer readable medium according to claim 14, wherein when the functional failure of the component is evident to the operating crew during performance of normal duties and the functional failure does not have the direct adverse effect on operating safety, the maintenance schedule of the component of the aircraft is maintained.

* * * * *